United States Patent
Ho et al.

(10) Patent No.: US 12,082,251 B2
(45) Date of Patent: Sep. 3, 2024

(54) TECHNIQUES FOR NON-SIMULTANEOUS TRANSMIT AND RECEIVE STATION OPERATION DURING SYNCHRONIZATION PROCEDURES

(71) Applicant: QUALCOMM Incorporated, San Diego, CA (US)

(72) Inventors: Sai Yiu Duncan Ho, San Diego, CA (US); George Cherian, San Diego, CA (US); Abhishek Pramod Patil, San Diego, CA (US); Alfred Asterjadhi, San Diego, CA (US); Raja Banerjea, San Jose, CA (US); Bin Tian, San Diego, CA (US); Yanjun Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/181,987

(22) Filed: Feb. 22, 2021

(65) Prior Publication Data

US 2021/0266965 A1 Aug. 26, 2021

Related U.S. Application Data

(60) Provisional application No. 62/981,445, filed on Feb. 25, 2020.

(51) Int. Cl.
*H04W 74/08* (2009.01)
*H04L 1/1607* (2023.01)
(Continued)

(52) U.S. Cl.
CPC ....... *H04W 74/0816* (2013.01); *H04L 1/1621* (2013.01); *H04W 56/0045* (2013.01); *H04W 72/541* (2023.01); *H04W 74/0891* (2013.01)

(58) Field of Classification Search
CPC .............. H04L 1/1621; H04W 56/001; H04W 56/0045; H04W 72/082; H04W 74/0816;
(Continued)

(56) References Cited

U.S. PATENT DOCUMENTS

2021/0076398 A1* 3/2021 Naribole ........... H04W 72/1257
2021/0160347 A1* 5/2021 Chu ....................... H04L 69/322
(Continued)

OTHER PUBLICATIONS

International Search Report and Written Opinion—PCT/US2021/019290—ISA/EPO—dated Jun. 11, 2021.
(Continued)

*Primary Examiner* — Pao Sinkantarakorn
(74) *Attorney, Agent, or Firm* — Arent Fox, LLP / Qualcomm

(57) ABSTRACT

This disclosure provides methods, devices and systems for non-simultaneous transmit and receive (STR) station (STA) transmissions using multiple links. In one aspect, a medium synchronization delay timer associated with a second link of the non-STR STA can be initiated in response to completing transmission of the data on the first link to delay triggering of a clear channel assessment (CCA) associated with the second link. Data can be transmitted on the second link in response to expiration of the medium synchronization delay timer. In another aspect, an energy detect (ED) threshold level on a second link may be decreased from a first ED threshold level to a second ED threshold level after transmitting the data on the first link. In a further aspect, a block acknowledgment (BA) frame including a network allocation vector (NAV) synchronization of a second access point may be transmitted to the first link of the station.

29 Claims, 8 Drawing Sheets

(51) Int. Cl.
*H04W 56/00* (2009.01)
*H04W 72/541* (2023.01)
*H04W 74/0816* (2024.01)

(58) Field of Classification Search
CPC .......... H04W 74/082; H04W 74/0891; H04W 76/15
See application file for complete search history.

(56) References Cited

U.S. PATENT DOCUMENTS

| | | |
|---|---|---|
| 2021/0195524 A1* | 6/2021 | Ahn .................. H04W 52/0229 |
| 2021/0195540 A1* | 6/2021 | Fischer ............. H04W 56/0015 |
| 2021/0266891 A1* | 8/2021 | Chu ...................... H04W 74/00 |
| 2022/0132572 A1* | 4/2022 | Fang ................. H04W 72/1231 |

OTHER PUBLICATIONS

Naribole (Samsung) S., et al., "Multi-Link Operation Channel Access Discussion", IEEE Draft, 11-19-1405-01-00BE-Multi-Link-Operation-Channel-Access-Discussion, IEEE-SA Mentor, Piscataway, NJ, USA, vol. 802.11 EHT, 802.11be, No. 1, Sep. 18, 2019 (Sep. 18, 2019), pp. 1-18, XP068160096, Retrieved from the Internet: URL: https://mentor.IEEE.org/802.11/dcn/19/11-19-1405-01-00be-multi-link-operation-channel-access-discussion.pptx [retrieved on Sep. 18, 2019] proposal, p. 11.

\* cited by examiner

TECHNIQUES FOR NON-SIMULTANEOUS TRANSMIT AND RECEIVE STATION OPERATION DURING SYNCHRONIZATION PROCEDURES

CROSS-REFERENCE TO RELATED APPLICATION(S)

This application claims the benefit of U.S. Provisional Patent Application No. 62/981,445, entitled "TECHNIQUES FOR NON-SIMULTANEOUS TRANSMIT AND RECEIVE STATION OPERATION DURING SYNCHRONIZATION PROCEDURES" and filed on Feb. 25, 2020, which is expressly incorporated by reference herein in its entirety.

TECHNICAL FIELD

This disclosure relates generally to wireless communication, and more specifically, to techniques for non-simultaneous transmit and receive (STR) station (STA) operation during synchronization procedures.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes transmitting data on a first link of a non-simultaneous transmit and receive (STR) station (STA) configured to communicate using multiple links. The method further includes initiating a medium synchronization delay timer associated with a second link of the non-STR STA in response to completing transmission of the data on the first link. The method further includes transmitting data on the second link in response to expiration of the medium synchronization delay timer.

Another aspect of the subject matter described in this disclosure can be implemented in an apparatus for wireless communication. The apparatus may include memory and a processor in communication with the memory. The processor may be configured to transmit data on a first link of a non-STR STA configured to communicate using multiple links. The processor may further be configured to initiate a medium synchronization delay timer associated with a second link of the non-STR STA in response to completing transmission of the data on the first link. The processor may further be configured to transmit data on the second link in response to expiration of the medium synchronization delay timer.

A further aspect of the subject matter described in this disclosure can be implemented in an apparatus for wireless communication. The apparatus may include means for transmitting data on a first link of a non-STR STA configured to communicate using multiple links. The apparatus may further include means for initiating a medium synchronization delay timer associated with a second link of the non-STR STA in response to completing transmission of the data on the first link. The apparatus may further include means for transmitting data on the second link in response to expiration of the medium synchronization delay timer.

Another aspect of the subject matter described in this disclosure can be implemented in a non-transitory computer-readable medium computer-readable medium including stored instructions of communications, executable by a processor to transmit data on a first link of a non-STR STA configured to communicate using multiple links, initiate a medium synchronization delay timer associated with a second link of the non-STR STA in response to completing transmission of the data on the first link, and transmit data on the second link in response to expiration of the medium synchronization delay timer.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

Like reference numbers and designations in the various drawings indicate like elements.

DETAILED DESCRIPTION

Figure 1:
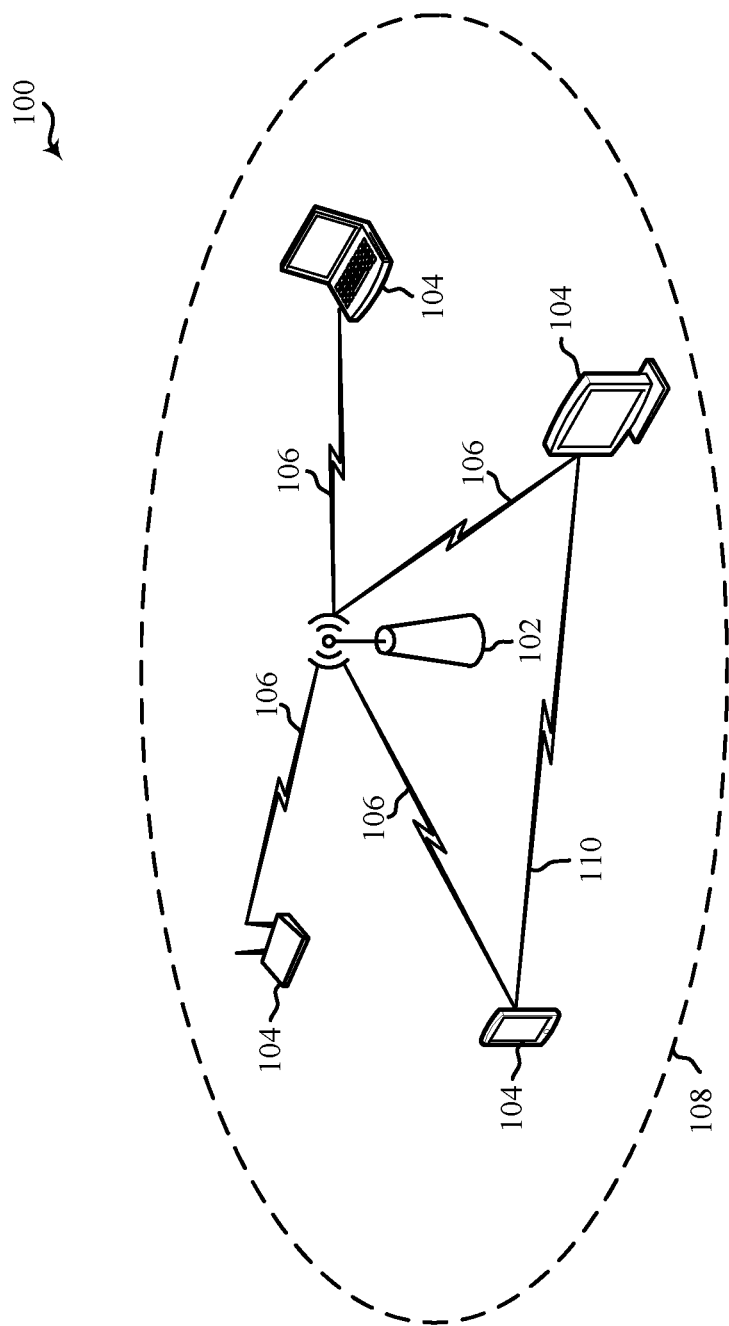
FIG. 1 shows a pictorial diagram of an example wireless communication network.

The following description is directed to some particular aspects for the purposes of describing innovative aspects of this disclosure. However, a person having ordinary skill in the art will readily recognize that the teachings herein can be applied in a multitude of different ways. The described aspects can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described aspects can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described aspects also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to non-simultaneous transmit and receive (STR) station (STA) operation during synchronization procedures. In general, a STA may have a countdown timer which may be referred to as a countdown prohibit timer or medium synchronization delay (MediumSyncDelay) timer that indicates a waiting time on a particular medium or channel prior to initiating a transmission on the medium or channel. In general, the value of the countdown timer is chosen by the transmitter in random to avoid collisions with other STAs that are also waiting to transmit on the medium or channel after the current transmission from another STA. When a non-STR STA is transmitting uplink data on a first link, the non-STR STA may not be able to receive downlink transmissions simultaneously on a second link.

However, due to self-interference of a transmission from the STA on the first link, the non-STR STA may not be able to initiate or continue the countdown on the second link either, which may be referred to as a clear channel assessment (CCA) blocked state. In this case, the non-STR STA may be "deaf" on the second link during the period of transmission on the first link as the non-STR STA may be unable to perform communications including the countdown for transmissions. The non-STR STA also may miss any preamble or the whole frame of another transmission on the second link, in which case the non-STR STA may not have been able to set its network allocation vector (NAV) properly. As such, when the transmission is finished on the first link, it may be desirable to configure non-STR STA operations on the second link after the "deaf" period so that it can be synchronized again to the second link in terms of the proper NAV settings on the second link.

Particular aspects of the subject matter described in this disclosure can be implemented to realize one or more of the following potential advantages. In some aspects, the described techniques can be used to start a medium synchronization delay timer on a second link of the non-STR STA after transmission on a first link has completed. This allows the STA to receive signaling and acquire synchronization before initiating the countdown, such as the CCA countdown, prior to transmitting on the second link. Similarly, if the non-STR STA performs a second transmission of the first link before expiration of the medium synchronization delay timer, then the medium synchronization delay timer will be re-started after the second transmission has completed. Thus, by implementing the medium synchronization delay timer as described herein, the non-STR STA may operate more efficiently. In some aspects, the non-STR STA may monitor the second link for a period of time after the transmission on the first link to determine if the non-STA STA may have missed a preamble transmission of another STA during the transmission on the first link. If the non-STR STA does not wait to monitor the second link for a period of time and instead starts the countdown immediately, the chances of collision with another transmission from another STA may be increased.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such aspects, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some aspects of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
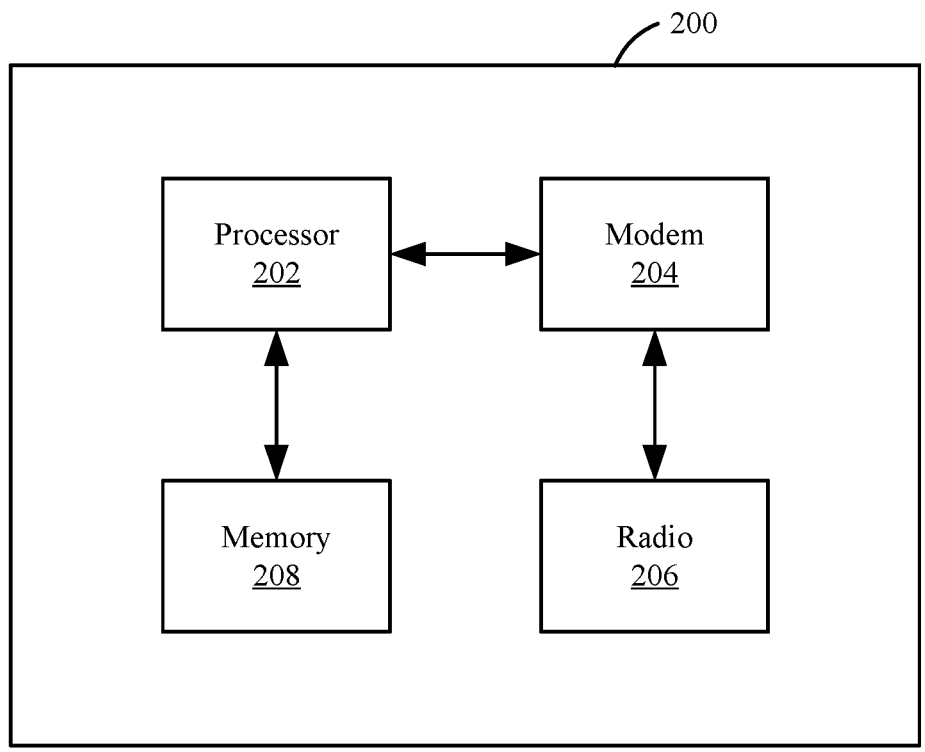
FIG. 2 shows a block diagram of an example wireless communication device.

FIG. 2 shows a block diagram of an example wireless communication device 200. In some aspects, the wireless communication device 200 can be an example of a device for use in a STA such as one of the STAs 104 described with reference to FIG. 1. In some aspects, the wireless communication device 200 can be an example of a device for use in an AP such as the AP 102 described above with reference to FIG. 1. The wireless communication device 200 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 200 can be, or can include, a chip, system on chip (SoC), chipset, package or device that includes one or more modems 202, for example, a Wi-Fi (IEEE 802.11 compliant) modem. In some aspects, the one or more modems 202 (collectively "the modem 202") additionally include a WWAN modem (for example, a 3GPP 4G LTE or 5G compliant modem). In some aspects, the wireless communication device 200 also includes one or more processors, processing blocks or processing elements 204 (collectively "the processor 204") coupled with the modem 202. In some aspects, the wireless communication device 200 additionally includes one or more radios 206 (collectively "the radio 206") coupled with the modem 202. In some aspects, the wireless communication device 200 further includes one or more memory blocks or elements 208 (collectively "the memory 208") coupled with the processor 204 or the modem 202.

The modem 202 can include an intelligent hardware block or device such as, for example, an application-specific integrated circuit (ASIC) among other possibilities. The modem 202 is generally configured to implement a PHY layer, and in some aspects, also a portion of a MAC layer (for example, a hardware portion of the MAC layer). For example, the modem 202 is configured to modulate packets and to output the modulated packets to the radio 204 for transmission over the wireless medium. The modem 202 is similarly configured to obtain modulated packets received by the radio 204 and to demodulate the packets to provide demodulated packets. In addition to a modulator and a demodulator, the modem 202 may further include digital signal processing (DSP) circuitry, automatic gain control (AGC) circuitry, a coder, a decoder, a multiplexer and a demultiplexer. For example, while in a transmission mode, data obtained from the processor 206 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 204. In aspects involving beamforming, the modulated symbols in the respective spatial streams are precoded via a steering matrix prior to their provision to the IFFT block.

While in a reception mode, the DSP circuitry is configured to acquire a signal including modulated symbols received from the radio 204, for example, by detecting the presence of the signal and estimating the initial timing and frequency offsets. The DSP circuitry is further configured to digitally condition the signal, for example, using channel (narrow-band) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 206) for processing, evaluation or interpretation.

The radio 204 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some aspects, the wireless communication device 200 can include, or be coupled with, multiple transmit antennas (each with a corresponding transmit chain) and multiple receive antennas (each with a corresponding receive chain). The symbols output from the modem 202 are provided to the radio 204, which then transmits the symbols via the coupled antennas. Similarly, symbols received via the antennas are obtained by the radio 204, which then provides the symbols to the modem 202.

The processor 206 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 206 processes information received through the radio 204 and the modem 202, and processes information to be output through the modem 202 and the radio 204 for transmission through the wireless medium. For example, the processor 206 may implement a control plane and at least a portion of a MAC layer configured to perform various operations related to the generation, transmission, reception and processing of MPDUs, frames or packets. In some aspects, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some aspects, the processor 206 may generally control the modem 202 to cause the modem to perform various operations described above.

The memory 204 can include tangible storage media such as random-access memory (RAM) or read-only memory (ROM), or combinations thereof. The memory 204 also can store non-transitory processor- or computer-executable software (SW) code containing instructions that, when executed by the processor 206, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 3B:
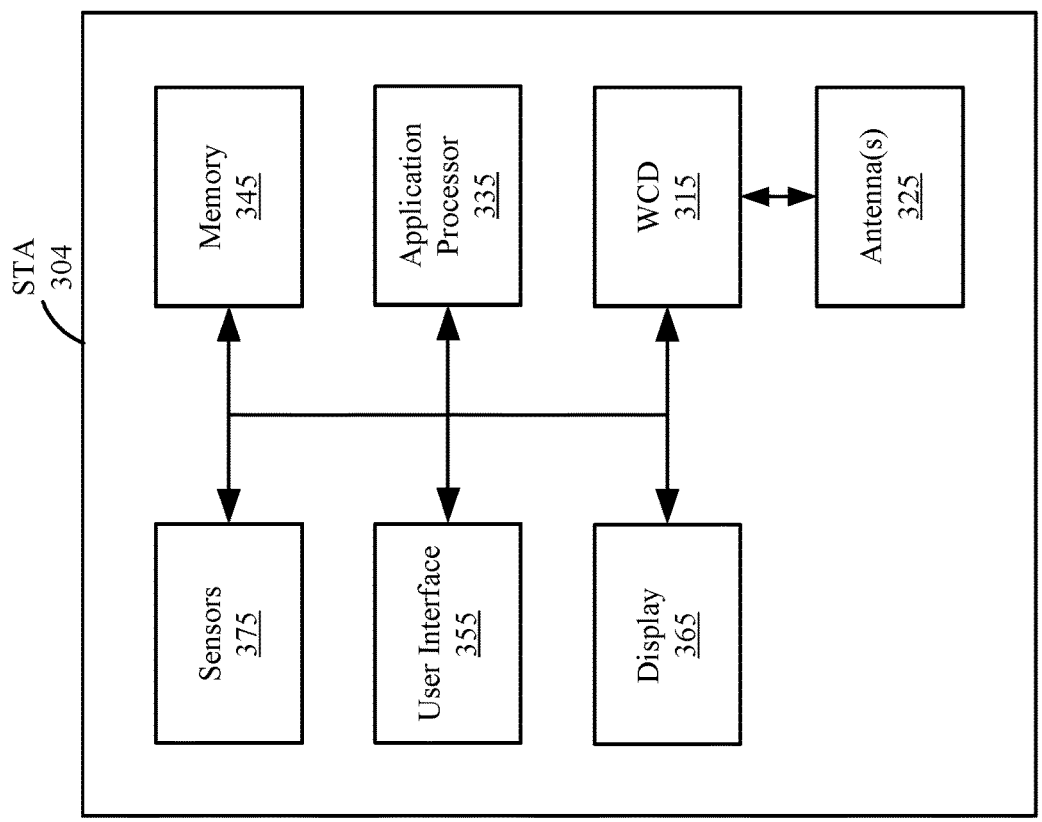
FIG. 3B shows a block diagram of an example station (STA).
Figure 3A:
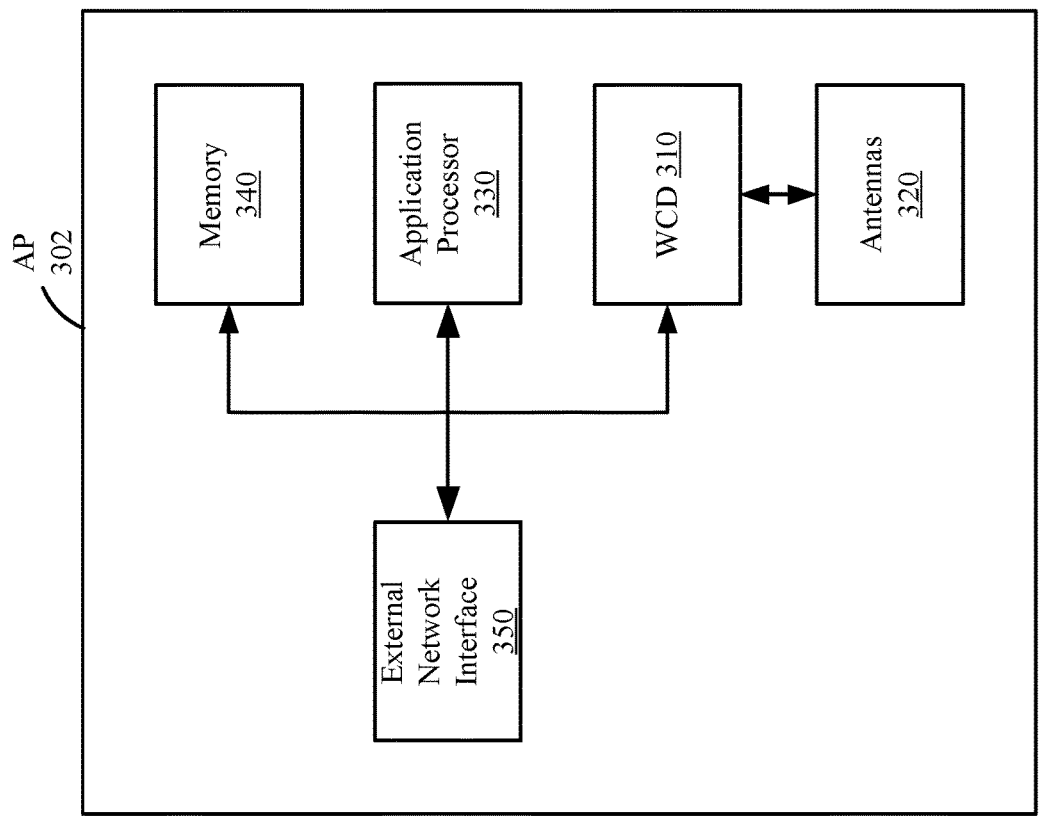
FIG. 3A shows a block diagram of an example access point (AP).

FIG. 3A shows a block diagram of an example AP 302. For example, the AP 302 can be an example aspect of the AP 102 described with reference to FIG. 1. The AP 302 includes a wireless communication device (WCD) 310 (although the AP 302 may itself also be referred to generally as a wireless communication device as used herein). For example, the wireless communication device 310 may be an example aspect of the wireless communication device 200 described with reference to FIG. 2. The AP 302 also includes multiple antennas 320 coupled with the wireless communication device 310 to transmit and receive wireless communications. In some aspects, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

FIG. 3B shows a block diagram of an example STA 304. For example, the STA 304 can be an example aspect of the STA 104 described with reference to FIG. 1. The STA 304 includes a wireless communication device 315 (although the STA 304 may itself also be referred to generally as a wireless communication device as used herein). For example, the wireless communication device 315 may be an example aspect of the wireless communication device 200 described with reference to FIG. 2. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some aspects, the STA 304 further includes a user interface (UI) 355 (such as a touchscreen or keypad) and a display 365, which may be integrated with the UI 355 to form a touchscreen display. In some aspects, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365.

Figure 4A:
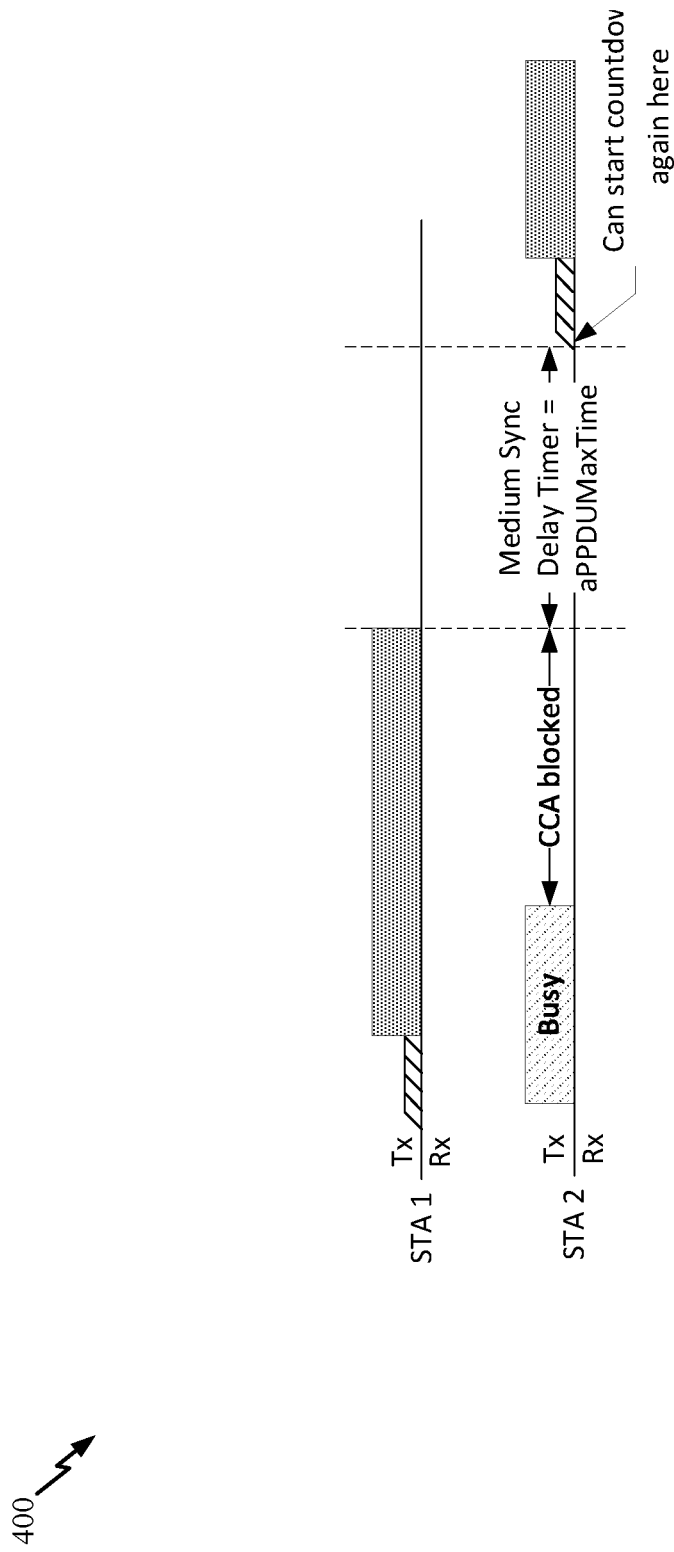
FIG. 4A shows a conceptual diagram of an example communication session at a STA.

FIG. 4A shows a conceptual diagram 400 of an example communication session at an non-STR STA. For example, an non-STR STA may correspond to a multi-link device that may not be capable of simultaneous or overlapping transmit and receive operations on multiple links for a given set of links. In other words, the non-STR STA is able to transmit or receive on a single link at a time. As noted above, when the non-STR STA is transmitting uplink data on the first link, such as after performing a countdown such as a CCA countdown, the non-STR STA may not be able to receive a downlink transmission on the second link. The non-STR STA also may not be able to continue the countdown (such as the CCA countdown) on the second link.

For example, the non-STR STA may not be able to continue the countdown on the second link during the transmission on the first link because the transmission on the first link interferes with the ability of the non-STR STA to receive signals on the second link. In some aspects, this may interfere with the ability of the non-STR STA to assess whether the medium of the second link is being used, or the interference may effectively indicate to the non-STR STA that the medium of the second link is being used. In one example, which should not be construed as limiting, the transmission on the first link may interfere with the countdown on the second link when the frequency of each link is within an interfering frequency range threshold, such as but not limited to, being within about 1 GHz.

Accordingly, the non-STR STA may countdown on the second link after a period of time, referred to herein as a medium synchronization delay time, elapses from an end of a transmission on the first link. For example, while the non-STR STA is transmitting on the first link (STA1), the non-STR STA may be unable to transmit or receive on the second link (STA2), as indicated in FIG. 4A by the "busy" and "CCA blocked" indications. It should be noted that the non-STR STA may be capable of communicating on two or more links, such as two or more different frequencies, but this example uses two links for simplicity. After the non-STR STA has completed transmission on the first link, the non-STR STA may initiate a medium synchronization delay timer having a medium synchronization delay time duration (also referred to as an aPPDUMaxTime) during which the non-STR STA may perform the network allocation vector (NAV) synchronization procedure. Specifically, the medium synchronization delay timer may prevent the STA from performing a countdown on the second link until a defined period, corresponding to the medium synchronization delay time duration, has elapsed. An amount of time of the synchronization delay time duration may be configurable, for example, to provide sufficient time for the non-STR STA to acquire synchronization. After an expiration of the synchronization delay timer, the non-STR STA may initiate the countdown on the second link (STA2). After the countdown has ended on the second link, the non-STR STA may then transmit data on the second link.

Additionally, in an aspect where the non-STR STA performs a second transmission on the first link after the medium synchronization delay timer has started and before its expiration, the non-STR STA may re-start the medium synchronization delay timer on the second link (STA2) at the end of the second transmission. Upon expiration of the re-started medium synchronization delay timer, the non-STR STA may begin the countdown (the CCA countdown), and after the countdown has ended on the second link, the non-STR STA may then transmit data on the second link.

In another aspect, after a transmission ends on the first link, the energy detect (ED) level of the STA2 may be reduced to approximately −82 dBm. If the STA2 misses a preamble transmission (such as by other STAs) that was within the PPDU1 transmission, the STA2 may still detect a transmission on the second link and may not resume its countdown.

Figure 4B:
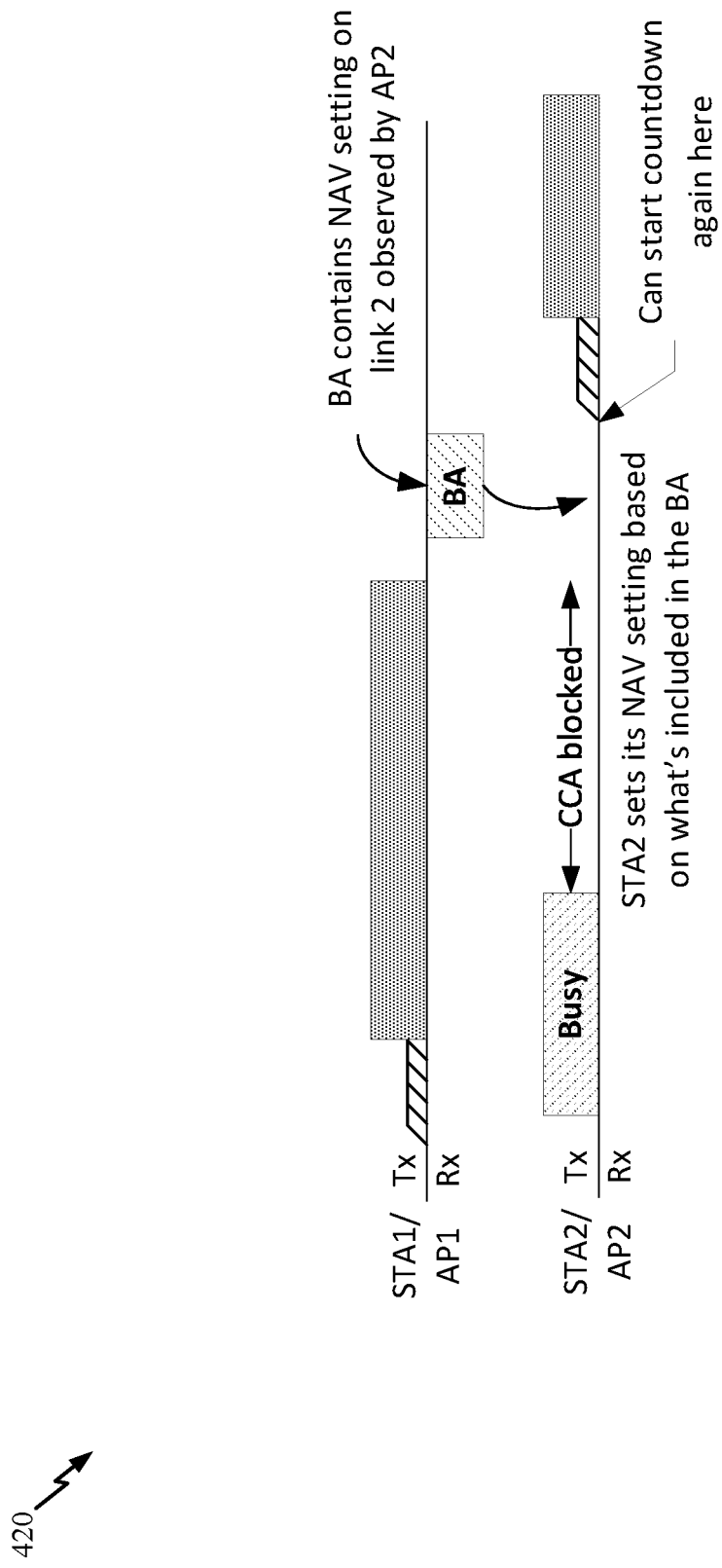
FIG. 4B shows a conceptual diagram of another example communication session at a STA.

FIG. 4B shows a conceptual diagram of an example communication session 420 at an non-STR STA. In some aspects, after the PPDU transmission on a first link (link 1) of the first station (STA1), a first AP (AP1) associated with the first link (link 1) may send a block acknowledgment (BA) frame. In some aspects, in the same BA, the first AP (AP1) can include a NAV setting of the second AP (AP2) and send the NAV setting to a first STA (STA1). The first STA (STA1) can then indicate the NAV setting to the second STA (STA2). The second STA (STA2) may then update its NAV based on the received information.

Figure 5A:
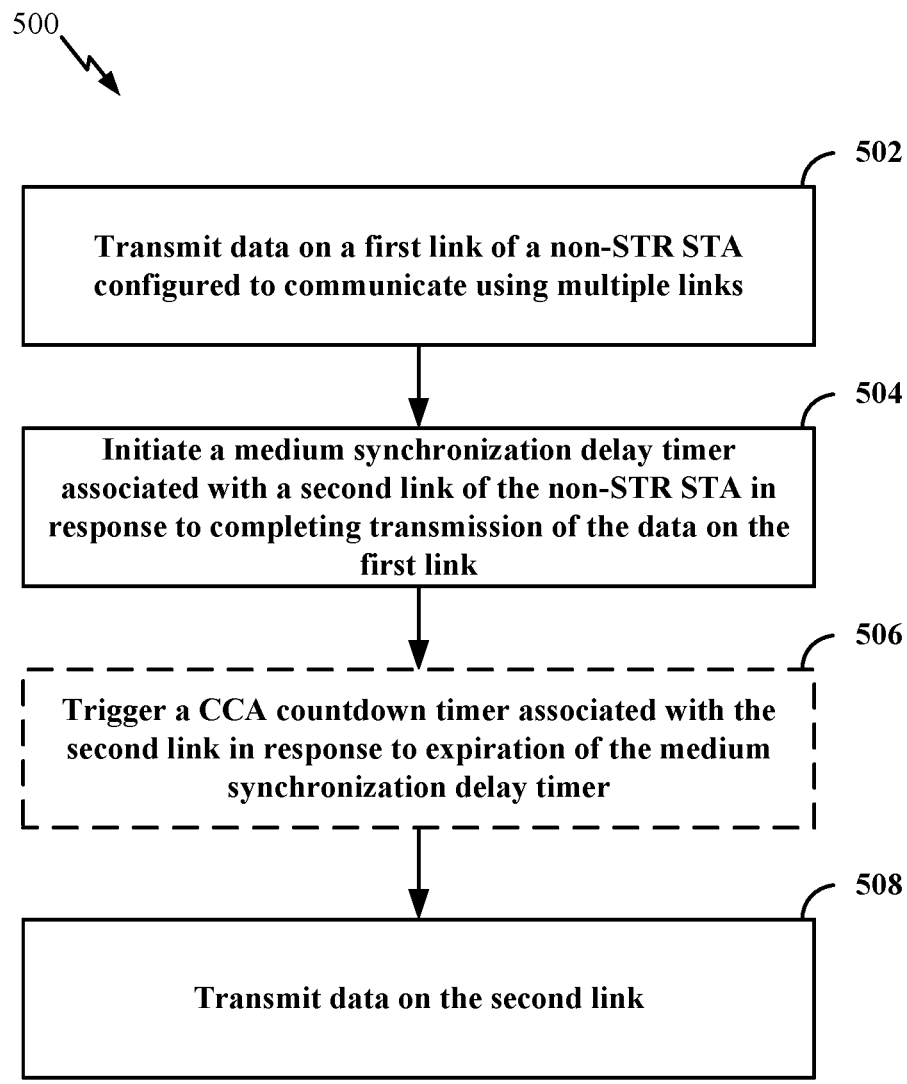
FIG. 5A shows a flowchart illustrating an example process for communications at a STA.

FIG. 5A shows a flowchart illustrating an example process 500 for communications at an STA according to some aspects. The operations of process 500 may be implemented by an STA or its components as described herein. For example, the process 500 may be performed by a wireless communication device such as the wireless communication device 200 described with reference to FIG. 2 and/or the STA 304 in FIG. 3. In some aspects, the process 200 may be performed by a non-STR STA, such as one of the STA described with reference to FIGS. 1 and 3B, respectively.

At block 502, the process 500 includes transmitting data on a first link of a non-STR STA configured to communicate using multiple links. For example, in an aspect, the STA 200, the processor 202 or the memory 208, the modem 204, or the radio 206 may be configured to transmit data on a first link of a non-STR STA configured to communicate using multiple links, as described with reference to FIGS. 1-4B. In another example, the STA 304 may activate the WCD 315 to transmit, using the antennas 325 the data on the first link.

At block 504, the process 500 includes initiating a medium synchronization delay timer associated with a second link of the non-STR STA in response to completing transmission of the data on the first link. For example, in an aspect, the STA 200, the processor 202 or the memory 208, the modem 204, or the radio 206 may be configured to initiate a medium synchronization delay timer associated with a second link of the non-STR STA in response to completing transmission of the data on the first link, as described with reference to FIGS. 1-4B. In another example, the application processor 335 of the STA 304 may trigger the medium synchronization delay timer stored in the memory 345 to delay transmission on the second link.

Optionally, at block 506, the process 500 includes triggering a clear channel assessment (CCA) countdown timer associated with the second link in response to expiration of the medium synchronization delay timer. For example, in an aspect, the STA 200, the processor 202 or the memory 208, the modem 204, or the radio 206 may be configured to trigger a CCA countdown timer associated with the second link in response to expiration of the medium synchronization delay timer, as described with reference to FIGS. 1-4B. In another example, the application processor 335 of the STA 304 may activate the CCA countdown timer stored in the memory 345 to run after expiration of the medium synchronization delay timer.

At block 508, the process 500 includes transmitting data on the second link in response to expiration of the CCA countdown timer. For example, in an aspect, the STA 200, the processor 202 or the memory 208, the modem 204, or the radio 206 may be configured to transmit data on the second link in response to expiration of the CCA countdown timer, as described with reference to FIGS. 1-4B.

In some aspects, the medium synchronization delay timer may prevent initiation of the CCA countdown timer for the second link following completion of the transmission of the data on the first link. In another example, the STA 304 may activate the WCD 315 to transmit, using the antennas 325 the data on the second link.

In some aspects, the transmission of the data on the first link interferes with a reception of signaling on the second link.

In some aspects, a first frequency of the first link is within an interfering frequency range of a second frequency of the second link.

In some aspects, the process 500 may optionally include initiating a second transmission on the first link while the medium synchronization delay timer is active, terminating the medium synchronization delay timer in response to the second transmission on the first link occurring while the medium synchronization delay timer is active, and re-initiating the medium synchronization delay timer in response to completion of the second transmission on the first link. For instance, the STA 304 may activate the WCD 315 to transmit, using the antennas 325 the second transmission on the first link, and the application processor 335 to terminate and re-initiate the medium synchronization delay timer based on completing the second transmission on the first link.

In some aspects, the process 500 may optionally include initiating a second medium synchronization delay timer associated with a third link of the non-STR STA in response to completing transmission of the data on the first link, triggering a second CCA countdown timer associated with the third link in response to expiration of the second medium synchronization delay timer, and transmitting data on the third link in response to expiration of the second countdown timer. For example, the application processor 335 of the STA 304 may trigger the second medium synchronization delay timer stored in the memory 345, and subsequently activate the second CCA countdown timer. Additionally, the STA 304 may activate the WCD 315 to transmit, using the antennas 325 data on the third link.

In some aspects, the transmission of the data on the first link interferes with a reception of signaling on both the second link and the third link, In some aspects, a first frequency of the first link is within an interfering frequency range of both a second frequency of the second link and a third frequency of the third link.

In some aspects, the process 500 may optionally include determining whether a channel detection condition has been satisfied, and terminating the medium synchronization delay timer based on determining that the channel detection condition has been satisfied. In some aspects, the channel detection condition may correspond to at least one of a decoding of a reception of a physical layer (PHY) protocol data unit (PPDU) associated with a valid medium access control PDU (MPDU), reception of a PPDU having a valid transmission opportunity duration, preamble, or completion of a NAV synchronization procedure.

In some aspects, the process 500 may optionally include receiving a BA from an AP on the first link, the BA includes a NAV synchronization of a second AP, and adjusting a NAV synchronization procedure of the second link based on the received BA. For example, the STA 304 may activate the WCD 315 to receive, using the antennas 325, the BA from the AP on the first link.

In some aspects, the medium synchronization delay timer may expire after a duration value, and the duration value may be received from an access point or defined at the STR STA.

Figure 5B:
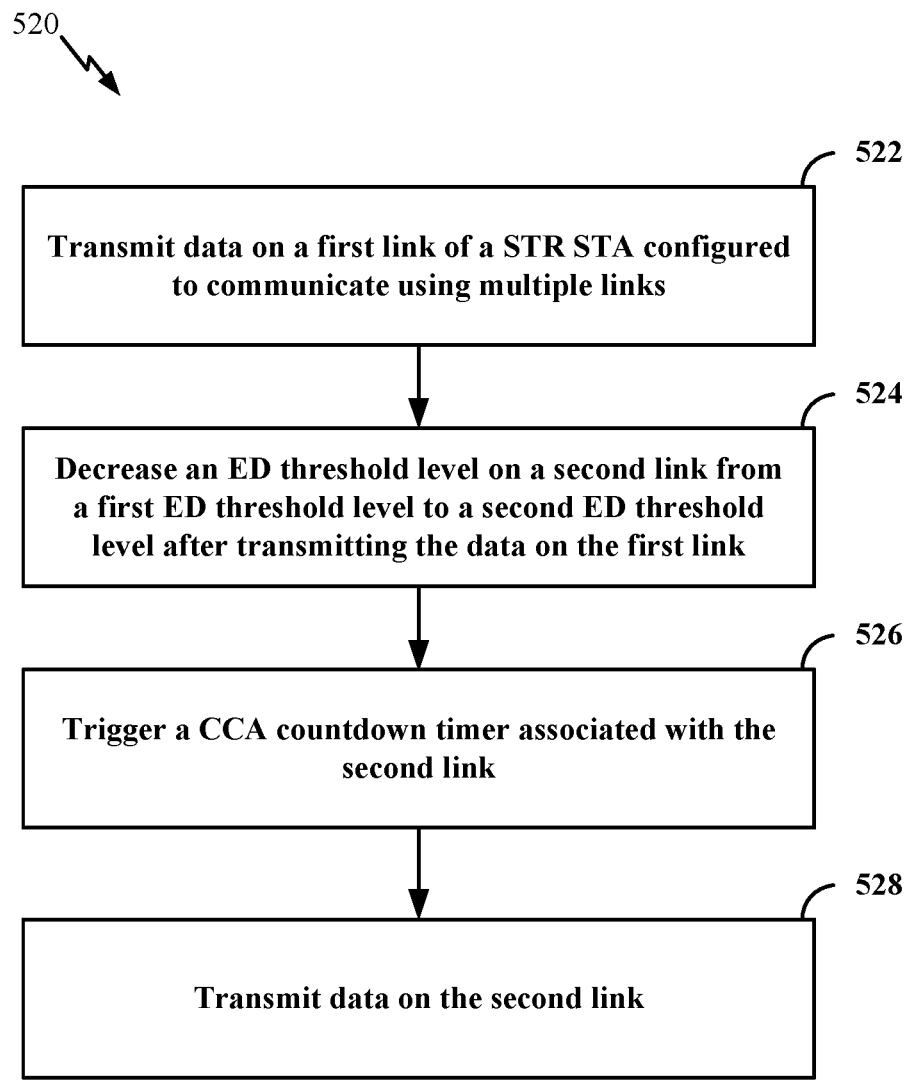
FIG. 5B shows a flowchart illustrating another example process for communications at a STA.

FIG. 5B shows a flowchart illustrating an example process 520 for communications at an STA. The operations of the process 520 may be implemented by a STA or its components as described herein. For example, the process 520 may be performed by a wireless communication device such as the wireless communication device 200 described with reference to FIG. 2. In some aspects, the process 520 may be performed by a non-STR STA, such as one of the STA described with reference to FIGS. 1 and 3B, respectively.

At block 522, the process 500 includes transmitting data on a first link of a STR STA configured to communicate using multiple links. For example, in an aspect, the STA 200, the processor 202 or the memory 208, the modem 204, or the radio 206 may be configured to transmit data on a first link of a STR STA configured to communicate using multiple links, as described with reference to FIGS. 1-4B. In another example, the STA 304 may activate the WCD 315 to transmit, using the antennas 325, the data on the first link.

At block 524, the process 500 includes decreasing an ED threshold level on a second link from a first ED threshold level to a second ED threshold level after transmitting the data on the first link. For example, in an aspect, the STA 200, the processor 202 or the memory 208, the modem 204, or the radio 206 may be configured to decrease an ED threshold level on a second link from a first ED threshold level to a second ED threshold level after transmitting the data on the first link, as described with reference to FIGS. 1-4B. In another example, the STA 304 may, via application processor 335, decrease the ED threshold level after transmitting data on the first link using antennas 325.

At block 526, the process 500 includes triggering a CCA countdown timer associated with the second link. For example, in an aspect, the STA 200, the processor 202 or the memory 208, the modem 204, or the radio 206 may be configured to trigger a CCA countdown timer associated with the second link, as described with reference to FIGS. 1-4B. In another example, the STA 304 may, via application processor 335, initiate the CCA countdown timer associated with the second link.

At block 528, the process 500 includes transmitting data on the second link. For example, in an aspect, the STA 200, the processor 202 or the memory 208, the modem 204, or the radio 206 may be configured to transmit data on the second link, as described with reference to FIGS. 1-4B. In another example, the STA 304 may activate the WCD 315 to transmit, using the antennas 325, the data on the second link.

In some aspects, the ED threshold level may be decreased substantially immediately after a completion of the transmission of the data on the first link.

In some aspects, the method 520 may optionally include increasing the ED threshold level from the second ED threshold level to the first ED threshold level after initiating transmission of the data on the second link.

Figure 5C:
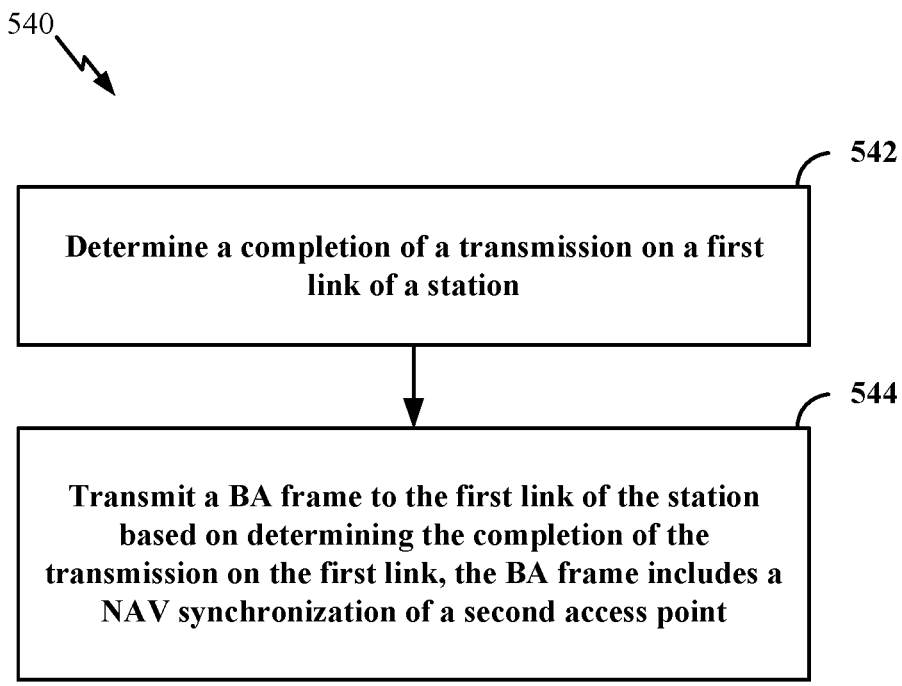
FIG. 5C shows a flowchart illustrating an example process for communications at an AP.

FIG. 5C shows a flowchart illustrating an example process 540 for communications at an AP. The operations of process 540 may be implemented by an AP or its components as described herein. In some aspects, the process 540 may be performed by a AP, such as the AP 302 described with reference to FIG. 3A.

At block 542, the process 500 includes determining a completion of a transmission on a first link of a station. For example, in an aspect, the AP 302, the processor 330 or the memory 340, or the radio 320 may be configured to determine a completion of a transmission on a first link of a station, as described with reference to FIGS. 1-4B. In another example, the STA 304 may, via application processor 335, determine the completion of the transmission on the first link when the allocated resources for the transmission have been transmitted.

At block 544, the process 500 includes transmitting a BA frame to the first link of the station based on determining the completion of the transmission on the first link, the BA frame includes a NAV synchronization of a second access point. For example, in an aspect, the AP 302, the processor 330 or the memory 340, or the radio 320 may be configured to transmit a BA frame to the first link of the station based on determining the completion of the transmission on the first link. In some aspects, the BA frame includes a NAV synchronization of a second access point, as described with reference to FIGS. 1-5B. In another example, the STA 304 may activate the WCD 315 to transmit, using the antennas 325, the BA frame to the first link.

Some Additional Examples

The aspects described herein additionally include one or more of the following implementation examples described in the following numbered clauses.
1. A method of communications, including:
   transmitting data on a first link of a non-simultaneous transmit and receive (STR) station (STA) configured to communicate using multiple links;
   initiating a medium synchronization delay timer associated with a second link of the non-STR STA in response to completing transmission of the data on the first link; and
   transmitting data on the second link in response to expiration of the synchronization delay countdown timer.
2. The method of clause 1, where the transmission of the data on the first link interferes with a reception of signaling on the second link.
3. The method of any preceding clause, where a first frequency of the first link is within an interfering frequency range of a second frequency of the second link.
4. The method of any preceding clause, further including:
   initiating a second transmission on the first link while the medium synchronization delay timer is active;
   terminating the medium synchronization delay timer in response to the second transmission on the first link occurring while the medium synchronization delay timer is active; and
   re-initiating the medium synchronization delay timer in response to completion of the second transmission on the first link.
5. The method of any preceding clause, where the medium synchronization delay timer expires after a duration value.
6. The method of any preceding clause, where the duration value is received from an access point or defined at the non-STR STA.
7. The method of any preceding clause, further including:
   determining whether a channel detection condition has been satisfied; and
   terminating the medium synchronization delay timer based on determining that the channel detection condition has been satisfied.
8. The method of any preceding clause, where the channel detection condition corresponds to at least one of:
   reception of a physical layer (PHY) protocol data unit (PPDU) associated with a valid medium access control PDU (MPDU),
   reception of a PPDU having a valid transmission opportunity duration,
   a decoding of a preamble, or
   completion of a network allocation vector (NAV) synchronization procedure.
9. The method of any preceding clause, further including:
   receiving a block acknowledgment (BA) from an access point (AP) on the first link, the BA includes a network allocation vector (NAV) synchronization of a second AP; and adjusting a NAV synchronization procedure of the second link based on the received BA.
10. The method of any preceding clause, further including:
    initiating a second medium synchronization delay timer associated with a third link of the non-STR STA in response to completing transmission of the data on the first link;
    triggering a second CCA countdown timer associated with the third link in response to expiration of the second medium synchronization delay timer; and
    transmitting data on the third link in response to expiration of the second countdown timer.
11. The method of any preceding clause, where the transmission of the data on the first link interferes with a reception of signaling on both the second link and the third link.
12. The method of any preceding clause, where a first frequency of the first link is within an interfering frequency range of both a second frequency of the second link and a third frequency of the third link.
13. The method of any preceding clause, further including:
    adjusting an energy detect (ED) threshold level on a second link from a first energy detect (ED) threshold level to a second energy detect (ED) threshold level after transmitting the data on the first link;
    triggering a clear channel assessment (CCA) countdown timer associated with the second link; and
    transmitting data on the second link.
14. The method of any preceding clause, where the ED threshold level is decreased immediately after a completion of the transmission of the data on the first link.
15. The method of any preceding clause, further including increasing the ED threshold level from the second ED threshold level to the first ED threshold level after initiating transmission of the data on the second link.
16. The method of any preceding clause, further including triggering a clear channel assessment (CCA) countdown timer associated with the second link in response to expiration of the countdown prohibit timer,
    where the countdown prohibit timer prevents initiation of the CCA countdown timer for the second link following completion of the transmission of the data on the first link.
17. An apparatus for communications, including:
    a memory; and
    a processor in communication with the memory and configured to:
        transmit data on a first link of a non-simultaneous transmit and receive (STR) station (STA) configured to communicate use multiple links;
        initiate a medium synchronization delay timer associated with a second link of the non-STR STA in response to complete transmission of the data on the first link; and
        transmit data on the second link in response to expiration of the synchronization delay countdown timer.
18. The apparatus of clause 17, where the transmission of the data on the first link interferes with a reception of signaling on the second link.
19. The apparatus of any preceding clause, where a first frequency of the first link is within an interfering frequency range of a second frequency of the second link.
20. The apparatus of any preceding clause, where the medium synchronization delay timer expires after a duration value.
21. The apparatus of any preceding clause, where the duration value is received from an access point or defined at the non-STR STA.
22. The apparatus of any preceding clause, where the processor is further configured to:
    determine whether a channel detection condition has been satisfied; and
    terminate the medium synchronization delay timer based on determining that the channel detection condition has been satisfied.
23. The apparatus of any preceding clause, where the channel detection condition corresponds to at least one of:
    reception of a physical layer (PHY) protocol data unit (PPDU) associated with a valid medium access control PDU (MPDU),
    reception of a PPDU having a valid transmission opportunity duration,
    a decoding of a preamble, or
    completion of a network allocation vector (NAV) synchronization procedure.
24. The apparatus of any preceding clause, where the processor is further configured to:
    receive a block acknowledgment (BA) from an access point (AP) on the first link, the BA includes a network allocation vector (NAV) synchronization of a second AP; and
    adjust a NAV synchronization procedure of the second link based on the received BA.
25. The apparatus of any preceding clause, where the processor is further configured to:
    initiate a second transmission on the first link while the medium synchronization delay timer is active;
    terminate the medium synchronization delay timer in response to the second transmission on the first link occurring while the countdown prohibit timer is active; and
    re-initiating the medium synchronization delay timer in response to completion of the second transmission on the first link.
26. The apparatus of any preceding clause, where the processor is further configured to:
    initiate a second medium synchronization delay timer associated with a third link of the non-STR STA in response to complete transmission of the data on the first link;
    trigger a second CCA synchronization delay associated with the third link in response to expiration of the second countdown prohibit timer; and
    transmit data on the third link in response to expiration of the second medium synchronization delay timer.
27. The apparatus of any preceding clause, where the transmission of the data on the first link interferes with a reception of signaling on both the second link and the third link.
28. The apparatus of any preceding clause, where a first frequency of the first link is within an interfering frequency range of both a second frequency of the second link and a third frequency of the third link.
29. An apparatus for communications, including:
    means for transmitting data on a first link of a non-simultaneous transmit and receive (STR) station (STA) configured to communicate use multiple links;

means for initiating a medium synchronization delay timer associated with a second link of the non-STR STA in response to complete transmission of the data on the first link; and means for transmitting data on the second link in response to expiration of the medium synchronization delay timer.

30. A computer-readable medium computer-readable medium including stored instructions of communications, executable by a processor to:

transmit data on a first link of a non-simultaneous transmit and receive (STR) station (STA) configured to communicate use multiple links;

initiate a medium synchronization delay timer associated with a second link of the non-STR STA in response to complete transmission of the data on the first link; and transmit data on the second link in response to expiration of the medium synchronization delay timer.

31. A method of communications, including:

transmitting data on a first link of a non-simultaneous transmit and receive (STR) station (STA) configured to communicate using multiple links;

decreasing an energy detect (ED) threshold level on a second link from a first energy detect (ED) threshold level to a second energy detect (ED) threshold level after transmitting the data on the first link;

triggering a clear channel assessment (CCA) countdown timer associated with the second link; and transmitting data on the second link.

32. The method of clause 31, where the ED threshold level is decreased immediately after a completion of the transmission of the data on the first link.

33. The method of any preceding clause, further including increasing the ED threshold level from the second ED threshold level to the first ED threshold level after initiating transmission of the data on the second link.

34. An apparatus for communications, including:

a memory; and a processor in communication with the memory and configured to:

transmit data on a first link of a non-simultaneous transmit and receive (STR) station (STA) configured to communicate using multiple links;

decrease an energy detect (ED) threshold level on a second link from a first energy detect (ED) threshold level to a second energy detect (ED) threshold level after transmitting the data on the first link;

trigger a clear channel assessment (CCA) countdown timer associated with the second link; and transmit data on the second link.

35. The apparatus of clause 34, where the at least one processor is further configured to perform the operations of one or more methods in claims 28 and 29.

36. A computer-readable medium computer-readable medium including stored instructions of communications, executable by a processor to:

transmit data on a first link of a non-simultaneous transmit and receive (STR) station (STA) configured to communicate using multiple links;

decrease an energy detect (ED) threshold level on a second link from a first energy detect (ED) threshold level to a second energy detect (ED) threshold level after transmitting the data on the first link;

trigger a clear channel assessment (CCA) countdown timer associated with the second link; and transmit data on the second link.

37. The computer-readable medium of clause 36, further including stored instructions of communications, executable by a processor to perform the operations of one or more methods in claims 32 and 33.

38. An apparatus for communications, including:

means for transmitting data on a first link of a non-simultaneous transmit and receive (STR) station (STA) configured to communicate using multiple links;

means for decreasing an energy detect (ED) threshold level on a second link from a first energy detect (ED) threshold level to a second energy detect (ED) threshold level after transmitting the data on the first link;

means for triggering a clear channel assessment (CCA) countdown timer associated with the second link; and means for transmitting data on the second link.

39. The apparatus of clause 38, including means for performing the operations of one or more methods in claims 32 and 33.

40. A method of communications at an access point, including:

determining a completion of a transmission on a first link of a station; and transmitting a block acknowledgment (BA) frame to the first link of the station based on determining the completion of the transmission on the first link, the BA frame includes a network allocation vector (NAV) synchronization of a second access point.

41. An apparatus for communications, including:

a memory; and a processor in communication with the memory and configured to:

determine a completion of a transmission on a first link of a station; and transmit a block acknowledgment (BA) frame to the first link of the station based on determining the completion of the transmission on the first link, the BA frame includes a network allocation vector (NAV) synchronization of a second access point.

42. A computer-readable medium computer-readable medium including stored instructions of communications, executable by a processor to:

determine a completion of a transmission on a first link of a station; and transmit a block acknowledgment (BA) frame to the first link of the station based on determining the completion of the transmission on the first link, the BA frame includes a network allocation vector (NAV) synchronization of a second access point.

43. An apparatus for communications, including:

means for determining a completion of a transmission on a first link of a station; and means for transmitting a block acknowledgment (BA) frame to the first link of the station based on determining the completion of the transmission on the first link, the BA frame includes a network allocation vector (NAV) synchronization of a second access point.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the aspects disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the aspects described in this disclosure may be readily apparent to persons having ordinary skill in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, various features that are described in this specification in the context of separate aspects also can be implemented in combination in a single aspect. Conversely, various features that are described in the context of a single aspect also can be implemented in multiple aspects separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

What is claimed is:

1. A method of communications, comprising:
    transmitting data on a first link of a non-simultaneous transmit and receive (STR) station (STA) configured to communicate using multiple links;
    initiating a medium synchronization delay timer after completing transmission of the data on the first link, the medium synchronization delay timer associated with a second link of the non-STR STA;
    initiating a second transmission on the first link while the medium synchronization delay timer is active;
    re-initiating the medium synchronization delay timer in response to completion of the second transmission on the first link; and
    transmitting data on the second link based on the medium synchronization delay timer.

2. The method of claim 1, wherein the transmission of the data on the first link interferes with a reception of signaling on the second link.

3. The method of claim 1, wherein a first frequency of the first link is within an interfering frequency range of a second frequency of the second link.

4. The method of claim 1, wherein the medium synchronization delay timer expires after a medium synchronization delay time duration has elapsed.

5. The method of claim 1, further comprising:
    determining whether a channel detection condition has been satisfied; and
    terminating the medium synchronization delay timer based on determining that the channel detection condition has been satisfied.

6. The method of claim 5, wherein the channel detection condition corresponds to at least one of:
    reception of a physical layer (PHY) protocol data unit (PPDU) associated with a valid medium access control PDU (MPDU),
    reception of a PPDU having a valid transmission opportunity duration,
    a decoding of a preamble, or
    completion of a network allocation vector (NAV) synchronization procedure.

7. The method of claim 1, further comprising:
    receiving a block acknowledgment (BA) from an access point (AP) on the first link, the BA includes a network allocation vector (NAV) synchronization of a second AP; and
    adjusting a NAV synchronization procedure of the second link based on the received BA.

8. The method of claim 1, further comprising:
    initiating a second medium synchronization delay timer associated with a third link of the non-STR STA in response to completing transmission of the data on the first link;
    triggering a clear channel assessment (CCA) countdown timer associated with the third link in response to expiration of the second medium synchronization delay timer; and
    transmitting data on the third link in response to expiration of the CCA countdown timer.

9. The method of claim 8, wherein the transmission of the data on the first link interferes with a reception of signaling on both the second link and the third link.

10. The method of claim 8, wherein a first frequency of the first link is within an interfering frequency range of both a second frequency of the second link and a third frequency of the third link.

11. The method of claim 1, further comprising:
    adjusting an energy detect (ED) threshold level on a second link from a first energy detect (ED) threshold level to a second energy detect (ED) threshold level after transmitting the data on the first link;
    triggering a clear channel assessment (CCA) countdown timer associated with the second link; and
    transmitting data on the second link.

12. The method of claim 11, wherein the ED threshold level is decreased immediately after a completion of the transmission of the data on the first link.

13. The method of claim 11, further comprising increasing the ED threshold level from the second ED threshold level to the first ED threshold level after initiating transmission of the data on the second link.

14. The method of claim 1, further comprising triggering a clear channel assessment (CCA) countdown timer associated with the second link in response to expiration of the medium synchronization delay timer,
wherein the medium synchronization delay timer prevents initiation of the CCA countdown timer for the second link following completion of the transmission of the data on the first link.

15. The method of claim 1, wherein the medium synchronization delay timer is initiated in response to completing transmission of the data on the first link.

16. The method of claim 1, further comprising:
terminating the medium synchronization delay timer in response to the second transmission on the first link occurring while the medium synchronization delay timer is active.

17. The method of claim 1, wherein transmitting the data on the second link comprises:
transmitting the data on the second link after an expiration of the medium synchronization delay timer.

18. An apparatus for communications, comprising:
a memory; and
a processor in communication with the memory and configured to:
transmit data on a first link of a non-simultaneous transmit and receive (STR) station (STA) configured to communicate use multiple links;
initiate a medium synchronization delay timer after completing transmission of the data on the first link, the medium synchronization delay timer associated with a second link of the non-STR STA;
initiate a second transmission on the first link while the medium synchronization delay timer is active;
re-initiate the medium synchronization delay timer in response to completion of the second transmission on the first link; and
transmit data on the second link based on the medium synchronization delay timer.

19. The apparatus of claim 18, wherein the transmission of the data on the first link interferes with a reception of signaling on the second link.

20. The apparatus of claim 18, wherein a first frequency of the first link is within an interfering frequency range of a second frequency of the second link.

21. The apparatus of claim 18, wherein the medium synchronization delay timer expires after a medium synchronization delay time duration has elapsed.

22. The apparatus of claim 18, wherein the processor is further configured to:
determine whether a channel detection condition has been satisfied; and
terminate the medium synchronization delay timer based on determining that the channel detection condition has been satisfied.

23. The apparatus of claim 22, wherein the channel detection condition corresponds to at least one of:
reception of a physical layer (PHY) protocol data unit (PPDU) associated with a valid medium access control PDU (MPDU),
reception of a PPDU having a valid transmission opportunity duration,
a decoding of a preamble, or
completion of a network allocation vector (NAV) synchronization procedure.

24. The apparatus of claim 18, wherein the processor is further configured to:
receive a block acknowledgment (BA) from an access point (AP) on the first link, the BA includes a network allocation vector (NAV) synchronization of a second AP; and
adjust a NAV synchronization procedure of the second link based on the received BA.

25. The apparatus of claim 18, wherein the processor is further configured to:
initiate a second medium synchronization delay timer associated with a third link of the non-STR STA in response to complete transmission of the data on the first link;
trigger a clear channel assessment (CCA) countdown timer associated with the third link in response to expiration of the second medium synchronization delay timer; and
transmit data on the third link in response to expiration of the CCA countdown timer.

26. The apparatus of claim 25, wherein the transmission of the data on the first link interferes with a reception of signaling on both the second link and the third link.

27. The apparatus of claim 25, wherein a first frequency of the first link is within an interfering frequency range of both a second frequency of the second link and a third frequency of the third link.

28. An apparatus for communications, comprising:
means for transmitting data on a first link of a non-simultaneous transmit and receive (STR) station (STA) configured to communicate use multiple links;
means for initiating a medium synchronization delay timer after completing transmission of the data on the first link, the medium synchronization delay timer associated with a second link of the non-STR STA;
means for initiating a second transmission on the first link while the medium synchronization delay timer is active;
means for re-initiating the medium synchronization delay timer in response to completion of the second transmission on the first link; and
means for transmitting data on the second link based on the medium synchronization delay timer.

29. A non-transitory computer-readable medium comprising stored instructions of communications, executable by a processor to:
transmit data on a first link of a non-simultaneous transmit and receive (STR) station (STA) configured to communicate use multiple links;
initiate a medium synchronization delay timer after completing transmission of the data on the first link, the medium synchronization delay timer associated with a second link of the non-STR STA;
initiate a second transmission on the first link while the medium synchronization delay timer is active;
re-initiate the medium synchronization delay timer in response to completion of the second transmission on the first link; and
transmit data on the second link based on the medium synchronization delay timer.

* * * * *